United States Patent [19]

Stastny

[11] 4,218,051
[45] Aug. 19, 1980

[54] WORKPIECE HOLDING FIXTURE

[76] Inventor: Joseph D. Stastny, 281 Ardmore Dr., Ferndale, Mich. 48220

[21] Appl. No.: 960,105

[22] Filed: Nov. 13, 1978

[51] Int. Cl.² ............................................. B25B 1/20
[52] U.S. Cl. .................................................. 269/131
[58] Field of Search ......................... 279/1 A; 81/69; 269/130–132, 127, 108

[56] References Cited

U.S. PATENT DOCUMENTS

| | | | |
|---|---|---|---|
| 1,644,755 | 10/1927 | Stephenson | 269/131 |
| 1,848,527 | 3/1932 | Hickey | 269/131 |
| 2,270,548 | 1/1942 | Olson | 269/127 |
| 2,324,379 | 7/1943 | Foster | 269/130 |
| 3,744,807 | 7/1973 | Spires et al. | 279/1 A |
| 4,145,006 | 3/1979 | Webb | 269/71 |

Primary Examiner—Robert C. Watson
Attorney, Agent, or Firm—Hauke and Patalidis

[57] ABSTRACT

A workpiece holding fixture in the form of an elongated cylindrical base member provided with an end adapted for mounting on the end of a rotatable spindle, such as the headstock of a lathe or like machine tool, the cylindrical member being provided at its other end with a seat appropriately arranged to engage a portion of the periphery of a workpiece of irregular shape, such as a pipe elbow or the like, and having clamping means for securely holding the workpiece on the seat with the portion of the workpiece on which a machining or fabricating operation is to be effected disposed rotatable through the intermediary of the holding fixture around an axis of rotation coinciding with the axis of rotation of the holding fixture.

16 Claims, 5 Drawing Figures

U.S. Patent  Aug. 19, 1980  4,218,051
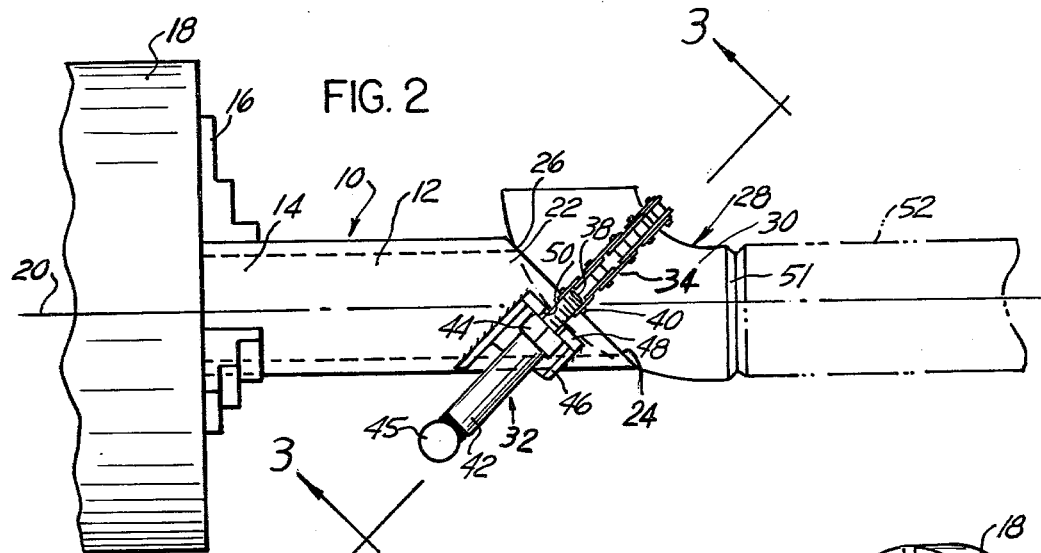
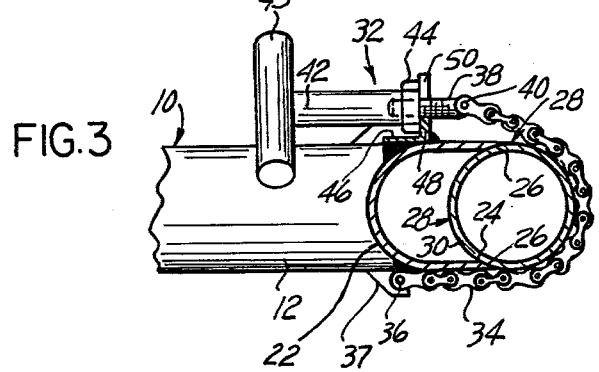
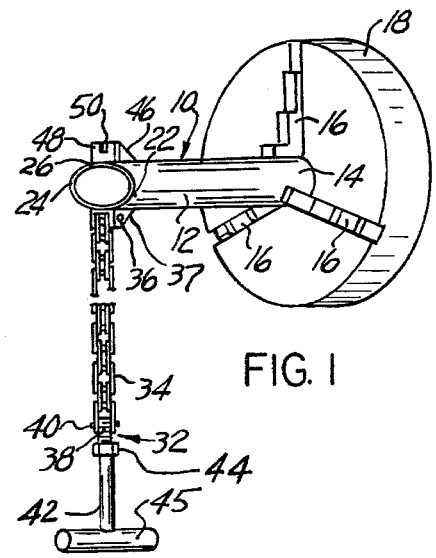
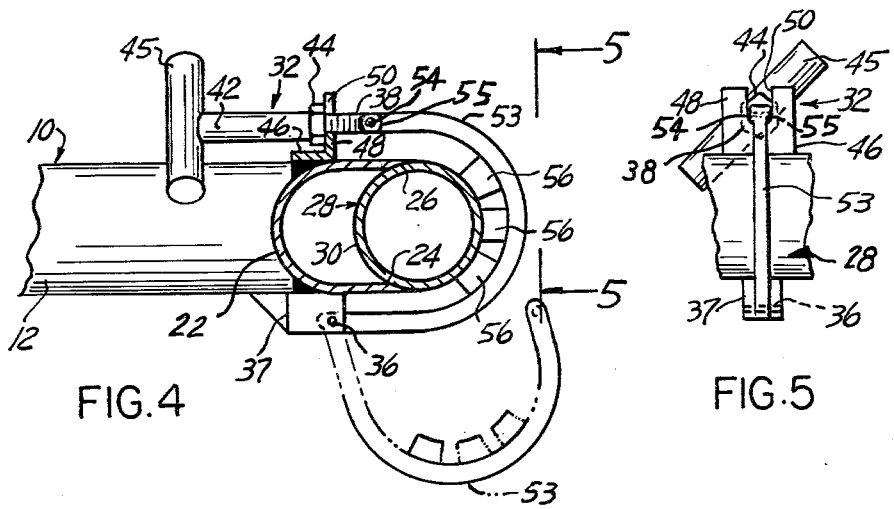
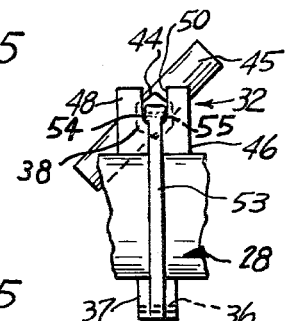

WORKPIECE HOLDING FIXTURE

BACKGROUND OF THE INVENTION

There are many machining or fabricating operations requiring a workpiece of irregular shape to be held securely on a rotating support means, such that a portion of the workpiece is subjected to rotation about a predetermined axis of rotation. When the workpiece has a regular shape, such as is the case for cylindrical workpieces, there is no particular problem involved in holding the workpiece, for example, in the chucking headstock of a lathe or other machine tool, while effecting a facing operation, cutting a tread, or the like on the other end of the workpiece, or placing a bead of welding material around the periphery of the workpiece. However, when the workpiece has a shape other than a true cylindrical shape, such as, for example, when a workpiece is a pipe elbow, considerable difficulties are encountered in holding and centering the workpiece such as to cause the workpiece to rotate true around an axis of rotation, while being securely held on the end of a rotatable spindle such as a lathe headstock or the like.

A typical example of machining operation or fabricating operation in which conventional chucking fixtures are inappropriate is one involving holding securely a pipe elbow on the end of a rotatable spindle, for example, for facing, beveling or threading one end of the elbow or, more particularly, for welding on the end of the elbow a second elbow or a length of pipe by means of an arc or flame welder held in a fixed position, the two members to be connected being rotated in close proximity to the welder head.

As it is not possible to hold a pipe elbow, for example, by way of conventional chucking fixtures, such as conventional lathe headstock chucks, holding fixtures have been contemplated in the past consisting of an angle plate mounted in the lathe chuck at an appropriate eccentric position, and supporting the pipe elbow by tack welding the pipe elbow to the angle plate. Such an arrangement presents many inconveniences. The set-up must be changed for each size of pipe elbow. Tack welding of the elbow to the angle plate is a time-consuming and delicate operation which requires chiseling or grinding to separate the elbow from the angle plate at the end of the machining or fabricating operation. In addition, the surface of the elbow is marred, structural integrity of the workpiece is jeopardized and, when part specifications call for a particular metallurgical composition of the elbow material, such as for some stainless steel materials, contamination of the material may occur through transfer of material from the angle plate or due to the composition of the weld used for tack welding. Furthermore, nonmetallic pipe elbow cannot be readily held in the fixture by tack welding.

It is also readily apparent that the holding strength is dependent on the quality of the tack welding, and that it may happen that the tack weld breaks during a machining operation.

SUMMARY OF THE INVENTION

The disadvantages and inconveniences of the prior art are eliminated by the present invention which provides an aligning and holding fixture for an irregularly shaped workpiece, such as pipe elbows and the like, for mounting such workpiece in a conventional chucking arrangement or holding means, and permitting the end or the portion of the workpiece on which a machining or fabricating operation is to be effected to be accurately aligned around a predetermined axis of rotation, which provides sturdy clamping of the workpiece in position and which permits rapid clamping and unclamping of the workpiece. The present invention accomplishes its purposes by means of a holding fixture in the form of a cylindrical member provided at one end with an appropriately angled and shaped seat portion encasing a portion of the periphery of the workpiece, and with manually operable clamp means in the form of a link chain, strap or the like, capable of being wrapped about a corresponding portion of the workpiece peripheral surface. The end of the clamp means is provided with a threaded member engageable between the branches of a bifurcated bracket. A female threaded member provided with manual grasping means, such as a T-handle or the like, is threaded over the male threaded member for drawing in the clamping link chain or strap against the surface of the workpiece with enough pressure to hold the latter securely in position on the holder seat.

The diverse objects and advantages of the invention will become apparent to those skilled in the art when the following description of some of the best modes contemplated for practicing the invention is read in conjunction with the accompanying drawing wherein:

BRIEF DESCRIPTION OF THE DRAWING

FIG. 1 is a perspective view of an example of holding fixture for irregular shape workpiece according to the present invention, mounted for rotation by a conventional chucking device;

FIG. 2 is a side elevation view thereof, showing a workpiece clamped on the end of the fixture;

FIG. 3 is a section thereof along line 3—3 of FIG. 2;

FIG. 4 is a view similar to FIG. 3 but showing a modification thereof; and

FIG. 5 is a view from line 5—5 of FIG. 4.

DETAILED DESCRIPTION OF THE PREFERRED EMBODIMENTS

Referring now to the drawing, and more particularly to FIG. 1 thereof, an example of workpiece support fixture 10 according to the present invention comprises an elongated member or mandrel 12, circularly cylindrical and preferably tubular having an end 14 for removable mounting between the jaws 16 of a conventional chucking device 18, such as the headstock chuck of a machine lathe or the like. The cylindrical member or mandrel 12, when mounted in the chucking device 18 is adapted to be rotated thereby concentric about a rotation axis, shown by dot and dash line 20 at FIG. 2.

The free end 22 of the cylindrical member or mandrel 12 is cut along a plane disposed generally at 45° with the longitudinal axis 20 of rotation of the cylindrical member or mandrel 12, and thus forms an annular surface, generally ellipsoidal in plane projection, defining a seat 24 which is preferably shaped slightly concave as shown at 26 to ensure better engagement with a convex peripheral surface portion of a workpiece, such as a workpiece 28, FIGS. 2 and 3.

The illustrated workpiece 28 is a 90° tubular or pipe elbow 30. The tubular elbow 30 is held in position on the seat 24 on the end of the cylindrical member or mandrel 12 by means of an adjustable clamp mechanism 32 which, as illustrated at FIGS. 1–3, consists of a link chain 34 hingedly connected at one end to a block 36, FIGS. 1 and 3, by means of pivot pin 37. The block 36 is welded, for example, to the peripheral surface of the cylindrical member or mandrel 12 at an appropriate location proximate the seat 24, such that the plane of bending of the link chain 34 is substantially orthogonal to the general plane of the seat 24. The free end of the link chain 34 is provided with a threaded stud 38 hinged thereon, as shown at 40. A female member or sleeve 42 threads on the end of the threaded stud 38. For that purpose, the sleeve 42 is internally threaded or, alternatively, and as illustrated in the drawing, the sleeve 42 may be provided on an end with a nut 44 welded thereon, which alone engages the thread of the threaded stud 38, the other end of the sleeve 42 being provided with a T-handle 45 for manual grasp. An aligned box bracket 46 is welded on the periphery of the cylindrical member or mandrel 12 proximate the seat 24, and the box bracket 46 is provided with a base plate 48 having a slot 50 accepting the threaded stud 38 therethrough.

When it is desired to place a workpiece 28 such as the pipe elbow 30 in the holding fixture 10, the pipe elbow 30 is positioned on the seat 24 in the position shown at FIG. 2, the hinged link chain 34 is wrapped around the peripheral surface of the pipe elbow and the threaded stud 38 is engaged in the slot 50 of the face plate 48 of the box bracket 46. The T-handle 45 is rotated such as to draw the threaded stud 38 and thus apply the link chain 34 tightly around the periphery of the pipe elbow 30. The pipe elbow 30 may be clamped on the seat 24 on the end of the holding fixture 10 with only enough pressure to allow slight lateral and longitudinal adjustment, as is generally done when clamping a cylindrical workpiece in the chucking member of a machine lathe, to ensure that, for example, the end portion 51 of the pipe elbow 30 rotates true relative to the axis 20 of rotation. Appropriate positioning gauges or rests may be used to simplify and make speedier the centering operation. Once the pipe elbow 30 is appropriately centered, by rotating the T-handle 45 additional clamping pressure may be exerted to securely hold it on the seat 24.

After the workpiece 28, such as the pipe elbow 30, is securely and precisely mounted on the end of the holding fixture 10, any appropriate machining operation, such as facing, threading, chamfering, or knurling may be effected on the end of the elbow by appropriate tools, while rotating the holding fixture 10 around its axis of rotation 20. It can also be seen that the holding and aligning fixture 10 of the invention may be used for holding an irregular shape workpiece such as the elbow 30, in alignment with, for example, a length of pipe 52, shown in phantom line at FIG. 2. By rotating the pipe elbow 30 and the length of pipe 52 in unison, a weld bead may be deposited at the junction between the two parts by means of a stationary welding head. The other end of the length of pipe 52 may be held in a rotatable chucking mechanism, not shown, rotated in unison with the chucking mechanism 18 holding the holding fixture 10. In the alternative, the length of pipe 52, supported by appropriate rests, may be aligned with the axis 20 of rotation, and tack welded to the end 51 of the pipe elbow 30, prior to being rotated in unison with the holding fixture 10 a full revolution rotation, or any number of required revolutions, for applying an appropriate weld bead at the junction between the parts. When the other end of the length of pipe is already provided with an elbow, or where it is desired to weld together end to end two elbows, the other elbow may be held in a rotatable chucking mechanism by means of second holding fixture 10.

As an alternative structure, the link chain 34 may be replaced by a strap, either flexible such as to wrap firmly around the exposed peripheral surface of the workpiece, or rigid as the rigid U-shaped strap 53 of FIGS. 4–5, hinged at one end to a support block 37, and provided on its other end with a threaded stud 38 having a bifurcated end 54 connected to the strap 53 by means of a hinging pin 55, the remaining structure being the same as hereinbefore explained in detail. The inner surface of the strap 53 may engage directly the peripheral surface of the pipe elbow 30, or, as shown at FIG. 4, it may be provided with a plurality of pads 56 for engaging such peripheral surface. The pads 56 may be made of soft material or may be made of materials having the same composition as the material making up the pipe elbow 30, such as to avoid contamination of the material of the pipe elbow when the elbow is heated during welding, where contamination is to be avoided as, for example, while fabricating a piping system for critical chemical or refinery installations.

Although the holding fixture 10 has been described and illustrated as comprising a tubular member 12 of constant diameter from end to end, it will be appreciated that where it is desired to manufacture holding fixtures for holding workpieces of large sizes, and the opening of the chucking mechanism holding the fixture is limited, a tubular or massive cylindrical member of a diameter which can be accommodated by the chucking mechanism is provided on its end with a tubular member of larger diameter welded or otherwise fastened thereon, the tubular member of larger diameter being in turn provided with the appropriate seat 24 for receiving and holding in clamping arrangement a workpiece of irregular shape. It will also be readily appreciated that the principle of the invention is adaptable to holding workpieces other than 90° elbows, such as, for example elbows of angles other than 90° and other irregular shape workpieces, the orientation of the several plane of the workpiece receiving seat being a function of the shape of the workpiece and of the alignment of the portion of the workpiece which it is desired to rotate concentric to a predetermined axis of rotation.

Having thus described the invention by way of examples of structural embodiment thereof, modifications whereof will be apparent to those skilled in the art, what is claimed as new is as follows:

1. A holding fixture for mounting in a chucking member an irregularly shaped workpiece with a portion thereof on which an operation is to be effected disposed concentric to a predetermined axis of rotation corresponding to the normal axis of rotation of said chucking member, said holding fixture comprising a cylindrical member mounted in said chucking member and having an axis of rotation corresponding to the axis of rotation of said chucking member and a seating face on the end of said cylindrical member for engagement with a portion of the peripheral surface of said workpiece, said seating face being generally disposed in a plane forming an angle with said axis of rotation causing said portion of said workpiece on which an operation is to be effected to be aligned concentric with said axis of rotation, and means clamping said workpiece in position on said seating face, wherein said clamping means comprises a link chain hingedly attached at one end to a portion of said cylindrical member proximate said seating face, a male threaded member hingedly affixed to the other end of said link chain, a bracket fixedly attached to a portion of said cylindrical member proximate said seating face, an aperture in said bracket for passing therethrough said male threaded member, and a female threaded member disposed on the other side of said bracket threadingly engaged on the end of the male threaded member. axis of rotation, and means clamping said workpiece in position on said seating face, wherein said clamping means comprises a strap hinged at one end to a portion of said cylindrical member proximate said seating face, a bracket fixedly attached to another portion of said cylindrical member proximate said seating face, an aperture in said bracket, a male threaded member hingedly mounted on the other end of said strap, and a female threaded member disposed on the other side of said bracket and threadably engageable with said male threaded member.

2. The holding fixture of claim 1 wherein said aperture is in the form of a slot enabling said male threaded member to be engaged in said slot without removing said female threaded member.

3. The holding fixture of claim 2 wherein said female threaded member is a tubular sleeve having an internally threaded end engaging said male threaded member and a T-handle on the other end.

4. A holding fixture for mounting in a chucking member an irregularly shaped workpiece with a portion thereof on which an operation is to be effected disposed concentric to a predetermined axis of rotation corresponding to the normal axis of rotation of said chucking member, said holding fixture comprising a cylindrical member mounted in said chucking member and having an axis of rotation corresponding to the axis of rotation of said chucking member and a seating face on the end of said cylindrical member for engagement with a portion of the peripheral surface of said workpiece, said seating face being generally disposed in a plane forming an angle with said axis of rotation causing said portion of said workpiece on which an operation is to be effected to be aligned concentric with said axis of rotation, and means clamping said workpiece in position on said seating face, wherein said clamping means comprises a strap hinged at one end to a portion of said cylindrical member proximate said seating face, a bracket fixedly attached to another portion of said cylindrical member proximate said seating face, an aperture in said bracket, a male threaded member hingedly mounted on the other end of said strap, and a female threaded member disposed on the other side of said bracket and threadably engageable with said male threaded member.

5. The holding fixture of claim 4 wherein said aperture is in the form of a slot enabling said male threaded member to be engaged in said slot without removing said female threaded member.

6. The holding fixture of claim 5 wherein said female threaded member is a tubular sleeve having an internally threaded end engaging said male threaded member and a T-handle on the other end.

7. The holding fixture of claim 4 further comprising pads disposed on the surface of said strap engageable with said workpiece.

8. The holding fixture of claim 4 wherein said strap is a substantially rigid U-shaped member.

9. A holding fixture for holding in a chucking member an elbow-shaped workpiece with an end thereof rotatable around a predetermined axis of rotation corresponding to the normal axis of rotation of said chucking member, said holding fixture comprising a cylindrical base member having an end removably attached to said chucking member, a generally angularly disposed seat formed on the other end of said cylindrical member, said seat being in the form of an annular face disposed generally in a plane angularly disposed relative to said axis of rotation, and means clamping said elbow on said seat by partial peripheral engagement therewith for engaging a portion of the surface of said elbow with the surface of said seat, the angle formed between said plane and said axis of rotation being such that the end face of said elbow is disposed concentric to said axis of rotation.

10. The holding fixture of claim 9 wherein said clamping means comprises strap means generally disposed in a second plane substantially perpendicular to the plane of said seat, hinge means pivotally attaching an end of said strap means to said member proximate said seat, and means removably fastening the other end of said strap means to said member proximate said seat.

11. The holding fixture of claim 10 wherein said strap means is a link chain.

12. The holding fixture of claim 10 wherein said strap means is a substantially rigid U-shaped member.

13. The holding fixture of claim 10 further comprising a plurality of pads attached to said strap means and disposed for engagement with a portion of the peripheral surface of said elbow.

14. The holding fixture of claim 10 wherein said means for releasably attaching the end of said strap means comprises a male threaded member hingedly mounted on the other end of said strap means, a bracket permanently attached to said member, an aperture in said bracket for passage therethrough of said male threaded member, and a threaded female member threadably engageable with said male threaded member passed through said aperture in said bracket.

15. The holding fixture of claim 14 wherein said aperture is a slot open at one end of said bracket.

16. The holding fixture of claim 14 wherein said female threaded member is a sleeve threaded at one end and provided with a T-handle at the other end.

* * * * *